(12) United States Patent
Puskala

(10) Patent No.: US 6,908,389 B1
(45) Date of Patent: Jun. 21, 2005

(54) PREDEFINED MESSAGES FOR WIRELESS MULTIPLAYER GAMING

(75) Inventor: Teemu Puskala, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/800,772

(22) Filed: Mar. 7, 2001

(51) Int. Cl.[7] .............................................. A63F 13/00
(52) U.S. Cl. .............................. 463/40; 463/42; 463/43
(58) Field of Search ............................ 463/1–6, 39–46; 380/251; 709/219; 455/412

(56) References Cited

U.S. PATENT DOCUMENTS

| | | | | |
|---|---|---|---|---|
| 5,297,205 A | * | 3/1994 | Audebert et al. | 380/251 |
| 5,663,717 A | * | 9/1997 | DeLuca | 340/825.36 |
| 5,797,085 A | * | 8/1998 | Beuk et al. | 370/328 |
| 5,999,808 A | * | 12/1999 | LaDue | 235/380 |
| 6,028,866 A | * | 2/2000 | Engel et al. | 370/312 |
| 6,052,120 A | * | 4/2000 | Nahi et al. | 345/700 |
| 6,117,013 A | * | 9/2000 | Eiba | 463/41 |
| 6,166,734 A | * | 12/2000 | Nahi et al. | 345/748 |
| 6,253,061 B1 | * | 6/2001 | Helferich | 455/458 |
| 6,301,471 B1 | * | 10/2001 | Dahm et al. | 379/114.1 |
| 6,301,609 B1 | * | 10/2001 | Aravamudan et al. | 707/1 |
| 6,354,946 B1 | * | 3/2002 | Finn | 463/40 |
| 6,363,419 B1 | * | 3/2002 | Martin et al. | 709/219 |
| 6,383,075 B1 | * | 5/2002 | Jeong et al. | 463/31 |
| 6,405,035 B1 | * | 6/2002 | Singh | 455/414 |
| 6,430,624 B1 | * | 8/2002 | Jamtgaard et al. | 709/246 |
| 6,470,180 B1 | * | 10/2002 | Kotzin et al. | 455/412.1 |
| 6,554,707 B1 | * | 4/2003 | Sinclair et al. | 463/39 |
| 6,573,824 B1 | * | 6/2003 | Lovegreen et al. | 340/7.1 |
| 2001/0003191 A1 | * | 6/2001 | Kovacs et al. | 709/226 |
| 2002/0112014 A1 | * | 8/2002 | Bennett et al. | 709/206 |

FOREIGN PATENT DOCUMENTS

| | | | | |
|---|---|---|---|---|
| EP | 0821536 | * | 1/1998 | |
| WO | WO 93/23125 | * | 11/1993 | |
| WO | WO 98/47589 | * | 10/1998 | |
| WO | WO 99/22560 | * | 5/1999 | |
| WO | WO 01/39854 A1 | | 6/2001 | A63F/9/18 |
| WO | WO 01/97539 A2 | | 12/2001 | H04Q/7/22 |

OTHER PUBLICATIONS

Ellen Jensen, instant messaging goes wireless, Wireless Review; Overland Park, Nov. 1, 1999.*
Pigeon Demo (Internet) http://pigeonsoftware.com/screen_shots.html, pp. 1–5, Oct. 2, 2000.
Age of Empires game manual pp. 1–3, 1997–1998.

* cited by examiner

Primary Examiner—John M. Hotaling, II
(74) Attorney, Agent, or Firm—Cohen, Pontani, Lieberman & Pavane

(57) ABSTRACT

A system and method for mobile terminal users who play networked games to communicate with each other. Messages to be sent between players and methods of sending the messages are predefined either by a game player or at the system level. These messages can then be sent in an easy way by the game player from his mobile terminal to another player or potential player for any of various game-related purposes.

60 Claims, 7 Drawing Sheets

GAME TERMINAL DATABASE ~32

| PLAYER # | TERMINAL TYPE | TERMINAL CAPABILITY/MESSAGE TYPE | DESTINATION ADDRESS |
|---|---|---|---|
| PLAYER 1 | NOKIA 3210 | PICTURE MESSAGE | ADDRESS 1 |
| PLAYER 2 | NOKIA 6210 | PICTURE MESSAGE | ADDRESS 2 |
| ...... | ...... | ...... | ...... |
| ...... | ...... | ...... | ...... |
| PLAYER 22 | NOKIA 2110 | TEXT MESSAGE | ADDRESS 22 |
| PLAYER 23 | NOKIA MULTIMEDIA | VIDEO MESSAGE | ADDRESS 23 |
| ...... | ...... | ...... | ...... |
| PLAYER XXXX | TERMINAL YYYY | MASSAGE ZZZZZZ | ADDRESS XXXX |

FIG. 4

PREDEFINED MESSAGES FOR WIRELESS MULTIPLAYER GAMING

BACKGROUND OF THE INVENTION

1. Field of the Invention

This invention relates to a system and method of communicating between players of games played over a wireless network.

2. Description of the Related Art

Predefined messages are, for purposes of the present invention, defined as electronic messages whose contents are predefined and stored in a database or other file of messages for sending any number of times by one player to another player at a later time. In contrast, a message that is not predefined is generally created by a user at substantially the time it is to be sent and is intended to be sent only once. It is advantageous to predefine messages when the same content is to be sent multiple times to one or many recipients so that it is unnecessary to repeatedly recreate the content of those messages. Sending predefined messages also reduces the load placed on the network by the sending of messages because the sender must only send a predefined command, rather than a textual message, and the network only has to recognize and process the known command by selecting which predefined message to send and to whom to send it.

PC-based games that are played online over a network such as the Internet sometimes permit the sending of predefined messages relating to the games. In gaming applications, predefined messages comprise mostly voice and text messages that are selected from a menu of messages and sent from one player to another to communicate the sender's sentiments. These predefined messages can be automated to be sent automatically upon the occurrence of a particular event. The predefined messages on the game or game system allow players to communicate more effectively and make the communication more amusing.

As the use of mobile (including wireless) terminals becomes ubiquitous, it is desirable to be able to send messages between players of online games that are played over a network using mobile terminals. Sending messages on mobile terminals through presents unique challenges. It is often difficult for a player to define a message to be sent while playing a game because the game often fills the entire relatively small display on the mobile terminal, and using a portion of the display to prepare a message to be sent will cover a substantial portion, if not all, of the game screen, making it difficult or impossible to see the game while communicating. Moreover, there is a dearth of simple input devices for mobile terminals, compared to the large variety of input means available on PC's including, most commonly, keyboards, mice, joysticks, and any number of specialized input devices. Mobile phones, for example, usually only have numeric keypads and possibly a few special feature buttons that can be used to enter messages. Entering messages by typing on a keyboard can be a slow process and can interrupt the game. Therefore, it is not only challenging to create games that can be played using mobile terminals but it is also challenging to find a simplified means for players to communicate before, during, or after the playing of the game.

Certain business-oriented commercial applications that operate over wireless networks likewise use predefined messages at times. However, none of these applications have applied the use of predefined messages to games played by multiple players over a mobile network.

SUMMARY OF THE INVENTION

To overcome limitations in the prior art described above, and to overcome other limitations that will become apparent upon reading and understanding the present specification, the present invention discloses a system and method of communication between players of games played over a wireless network. The wireless device is not limited to any present navigation structure, and provides the ability to remotely access networked game services.

In accordance with a first embodiment of the invention, an online gaming system for playing games comprises at least one wireless terminal adapted to run a game to be played with at least one of another wireless terminal and a game platform running the game. The online gaming system comprises a game program for providing at least one game-related predefined message based on a predefined game-related criteria. The predefined message is sent to at least one of a plurality of preselected destination addresses taking into consideration terminal capabilities of the preselected destination addresses and is subject to interaction with a user of the at least one wireless terminal.

In accordance with a second embodiment of the invention, an online gaming system for playing games comprises at least one wireless terminal adapted to run a game to be played with at least one of another terminal and a game platform running the game, a processor within the at least one wireless terminal for controlling functions relating to the game, a storage device in communication with the processor, and a game program. The game program is operative on at least one of the processor of the wireless terminal and at the game platform for maintaining in the storage device a database identifying at least one set of predefined messages available to send to at least one of a plurality of preselected destination addresses, for scanning game-related events to identify conditions matching any of at least one predefined game-related criteria, and for providing, based on any of the predefined game-related criteria, at least one game-related predefined message when at least one of the conditions matching any of the at least one predefined game-related criteria is identified. The at least one predefined message is sent to the at least one of a plurality of preselected destination addresses taking into consideration terminal capabilities of the preselected destination addresses and is subject to interaction with a user of the at least one wireless terminal.

In accordance with a third embodiment of the invention, a method of providing an online gaming system for playing games comprises connecting at least one wireless terminal adapted to run a game to be played with at least one of another wireless terminal and a game platform running the game, scanning game-related events to identify conditions matching any of at least one predefined game-related criteria, and providing, based on any of the predefined game-related criteria, at least one game-related predefined message when at least one of the conditions matching any of the at least one predefined game-related criteria is identified. The at least one predefined message is sent to the at least one of a plurality of preselected destination addresses taking into consideration terminal capabilities of the preselected destination addresses and is subject to interaction with a user of the at least one wireless terminal.

In accordance with a fourth embodiment of the invention, a wireless terminal for playing games comprises a processor for controlling functions relating to a game, a storage device in communication with the processor, a primary input in communication with the processor for registering game-related commands input by a user of a wireless terminal, and a game program. The game program is operative on the processor of the wireless terminal for maintaining in the storage device a database identifying at least one set of predefined messages available to send to at least one of a plurality of preselected destination addresses, for scanning game-related events to identify conditions matching any of at least one predefined game-related criteria, and for providing, based on any of the predefined game-related criteria, at least one game-related predefined message when at least one of the conditions matching any of at least one predefined game-related criteria is identified. The at least one predefined message is sent to the at least one of a plurality of preselected destination addresses taking into consideration terminal capabilities of the preselected destination addresses and is subject to interaction with a user of the at least one wireless terminal.

The game-related predefined messages in all embodiments are generally one of the following types of messages: a game play message to be sent to the second game player during a game, a game-environment message related to playing a game to be sent to the second game player before or after the playing of a game, or an automated message to be sent to the second game player upon an occurrence of a specified event. Each predefined message may be defined to comprise at least one of voice, text, sound, an image, a picture, a brief video, and a multimedia message, and may be stored at the first mobile terminal or at a network-based message database accessible to the first mobile terminal. A selection means, such as the keypad, touch screen or voice-activated message selection menu, is used to select a player to whom a particular predefined message should be sent.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views:

FIG. 4 depicts an example of a game terminal database used in the exemplary embodiment of the invention;

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Figure 1:
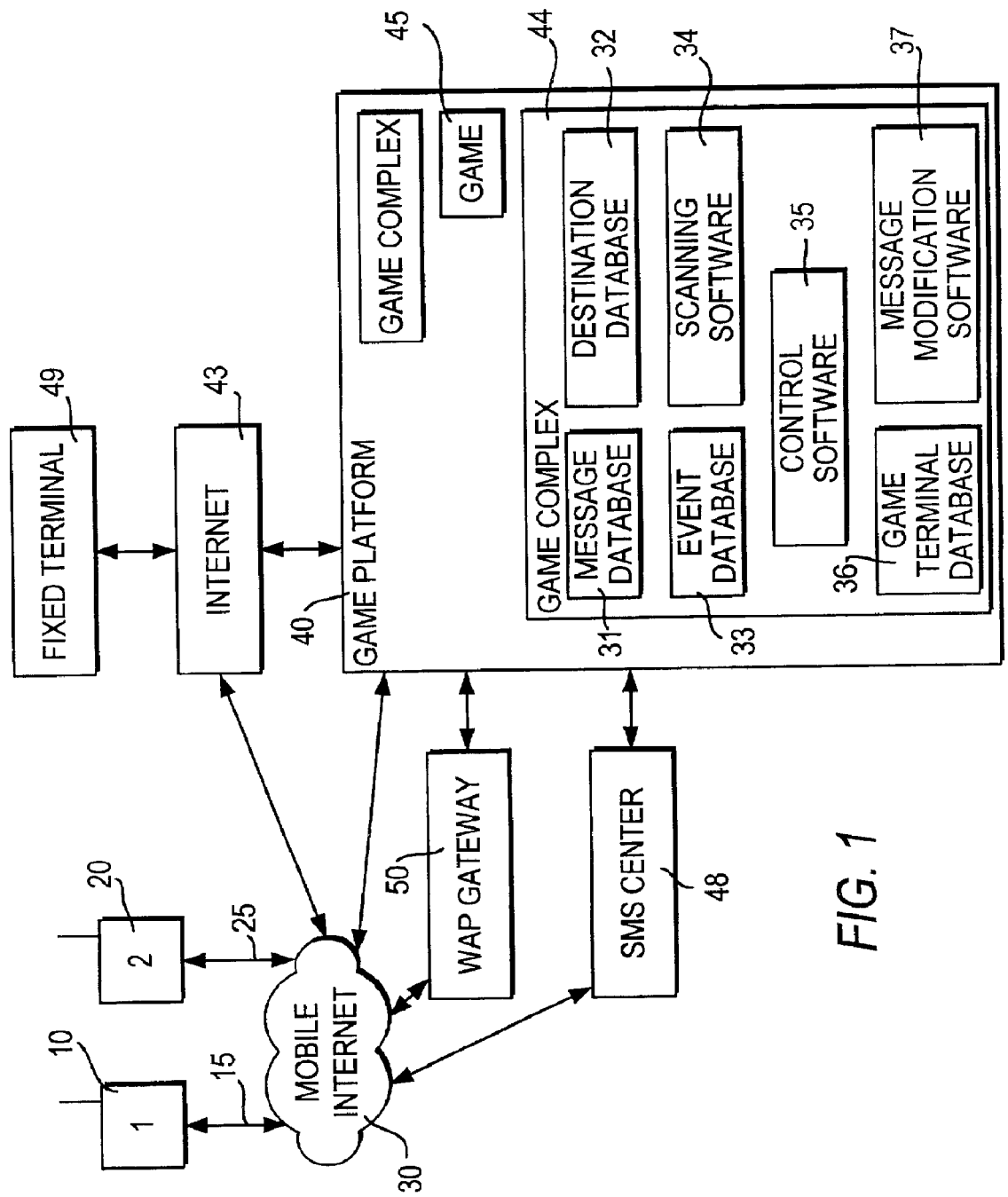
FIG. 1 depicts a system architecture for the playing of games available over a mobile network according to one embodiment of the present invention.

Referring to FIG. 1, a communications system 1 for implementing the present invention according to one embodiment of the invention provides one or more game players with mobile terminals 10, 20, such as a mobile phone, a personal digital assistant (PDA), or another terminal that wirelessly connect to or are under the coverage of one or more mobile or wireless communications networks that permit messages to be sent between terminals 10, 20. The mobile terminals 10, 20 are capable of presenting data information in various ways such as text, voice, audio, and multimedia. FIG. 1 illustrates an example where terminals 10 and 20 are connected to a mobile network 30. The mobile network 30 may be any type of wireless communication network or combination of networks, including, but not limited to, GSM (Global Standard for Mobile/Groupe Speciale Mobile), GPRS (General Packet Radio System), UMTS (Universal Mobile Telephone System) or 3G (Third generation of mobile communications), where 3G can be compatible with GSM, HSCSD (High Speed Circuit Switched Data), GPRS, EDGE (Enhanced Data Rates for Global/GSM Evolution) and WCDMA (Wideband Code Division Multiple Access). Various other network systems can also be supported in 3G, such as CDMA (Code Division Multiple Access), PDC (Personal Digital Communications), or CDMA2000. The mobile terminals 10, 20 may also communicate through a WLAN (Wireless Local Area Network) or another LPRF (Low Power Radio Frequency) network such as a Bluetooth network. The transmission may also be broadcast via DAB (Digital Audio Broadcasting) or DVB (Digital Video Broadcasting). Terminals 10, 20 may be linked to the mobile network 30 by respective communication links 15, 25, such as links that permit communications substantially in real time.

A network-based game system may be implemented over communications system 1. The network-based game system includes game platform 40 that is connected to the mobile network 30 and the Internet 43 and hosts the games 45 to be played. Game platform 40 includes a game complex 47 comprising the hardware and software that enable the predefined messaging with a game/messaging application and functions like chat rooms for players.

Game complex 47 (the "game program") comprises a message database 31 for storing game-related predefined messages and to "open" and recognize codes sent by a player from one of the wireless terminals 10, 20 to game platform 40. For example, the message database must recognize that code *5 sent by terminal 10 represents a particular predefined message in message database 31 that is to be sent to a predefined destination (e.g. sent message 5 to all players). Game complex 47 further comprises a destination database 32 that stores the predefined destinations where game-related messages are to be sent (e.g., addresses of wireless terminals 10, 20 and addresses of any other game platforms). When a user enters a command to send a predefined message, the command is sent to game platform 40, which receives the command and sends the message to the destination address(es), as previously specified to the game platform 40 in destination database 32 or as specified in the command. Predefined messages may also be stored at mobile terminal 10 in memory 56 and sent from there in which case the predefined message will be sent from mobile terminal 10 to the game platform 40 for distribution when the command is given to send a predefined message.

Game complex 47 further comprises an event database 33 for storing game-related events that trigger game-related messages (e.g. capturing, beating, killing, hitting, and seeing an opponent during a game), scanning software (or a circuit) 34 that functions as a scanning means for checking the game-related events as they occur and comparing them to contents of event database 33, and control software (or a circuit) 35 for preparing a list of event-related predefined messages to be sent to a player when scanning software 34 indicates a match between an event occurring during the game and the events listed in the event database 33.

Game complex 47 additionally includes a game terminal database 36, which includes a list of terminals connected at a particular time to a game and the specifics about these terminals such as their capabilities, and modification software (or a circuit) 37 for making any necessary adjustments to predefined messages to make them compatible for playing on all terminals connected to the game in accordance with the terminal capabilities as provided for in game terminal database 36.

The game functionality may be enhanced by utilizing a wireless application protocol (WAP) browser at mobile terminal 10 to connect to game platform 40 via a WAP gateway 50 that connects mobile network 30 and game platform 40 such that the send predefined message is in a WAP format. Game platform 40 and WAP gateway 50 may be platforms based on an operating system such as Microsoft Windows NT, Linux, etc. Where the WAP implementation on mobile terminal 10 does not support sound or streaming video messages, additional client software that adds these capabilities to the browser may be used. Predefined messages may also be sent as an SMS (short message service) message from game platform 40 to mobile terminals 10, 20 if an SMS center 48 is connected between game platform 40 and mobile network 30.

It should be noted that it is also possible to implement the present invention as a gaming system in which games are played between players having mobile terminals without a game platform 40 as an interface between the players. In this implementation, predefined messages will be stored only at the mobile terminals 10, 20 and sent directly between the players. This implementation is especially suitable for games implemented on short range networks in which terminals on the network communicate by short range transmissions.

Figure 2:
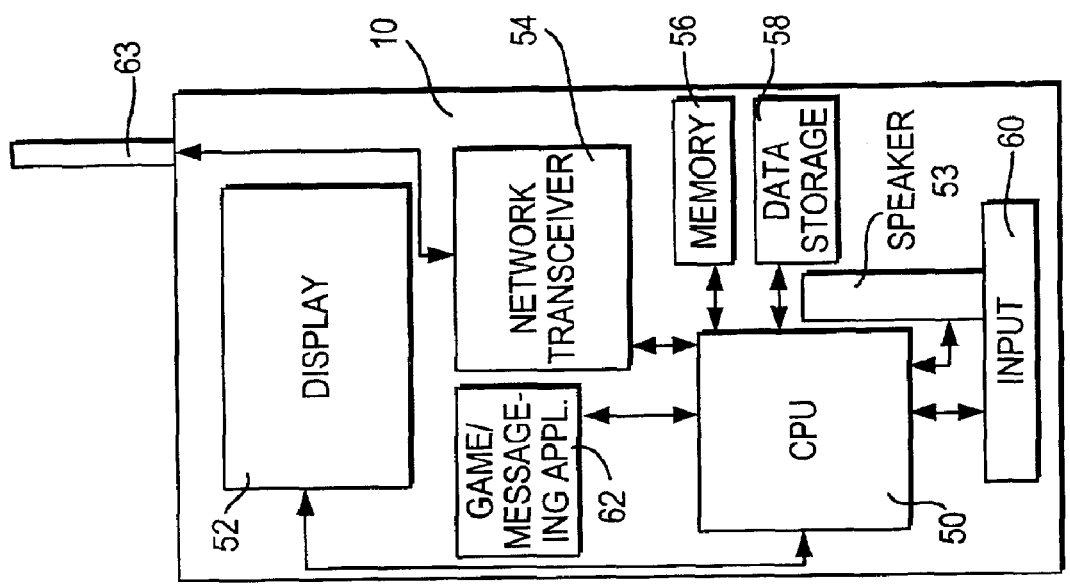
FIG. 2 depicts a block diagram of a mobile terminal showing components used in the exemplary embodiment of the invention.

FIG. 2 is a simplified illustration of mobile terminal 10 according to one exemplary embodiment of the invention showing various components used to perform the procedures of this invention. The mobile terminal 10, for example, has various components (mobile terminal 20 may generally have the same hardware and software components) comprising a central processing unit (CPU) 50 for controlling and executing all necessary procedures, and a display 52 that allows, for example, the player to read information. Display 54 may be provided with the capability of displaying multimedia information such as video. The mobile terminal 10 further comprises a network transceiver 54 to receive transmission from and to the mobile network 30, a memory 56 and a data storage 58. Data storage 58 can also be used to store and retrieve information about other players and predefined messages. The data storage 58 can be, for example, a hard disk magnetic or optical storage unit, as well as a CD-ROM drive or a flash memory. Mobile terminal 10 also comprises one or more input means 60 for inputting the information into the terminal, and an antenna 64. Input means 60 or means for input may be, for example, a numeric keypad, a keyboard, a software keyboard touch screen, a touch screen (in combination with the display 52), a mouse, a pointing device such as pointing pen, a voice command system, etc. In the case of DVB or DAB, the terminal must also have a DVB or DAB receiver (not shown). The mobile terminal 10 may provide voice or sound output through a speaker 53.

A messaging application 62 on mobile terminal 10 enables network access and localized support functions for a player to play a networked game, including the programming of predefined messages, including the creation or modification of the predefined messages, in accordance with the invention. Depending on how the game platform 40 is implemented, messaging application 62 may comprise customized application-specific software, which may be written in a language such as wireless markup language (WML) or Java. Alternatively, the messaging application 62 may comprise web access software, such as the above-mentioned WAP browser software, or an interface software enabled by another operating system such as Microsoft Windows CE, the Pocket PC operating system, the Palm® operating system, or the upcoming Psion EPOC operation system. Game platform 40 must support whatever method of communication messaging application 62 uses.

Figure 3:
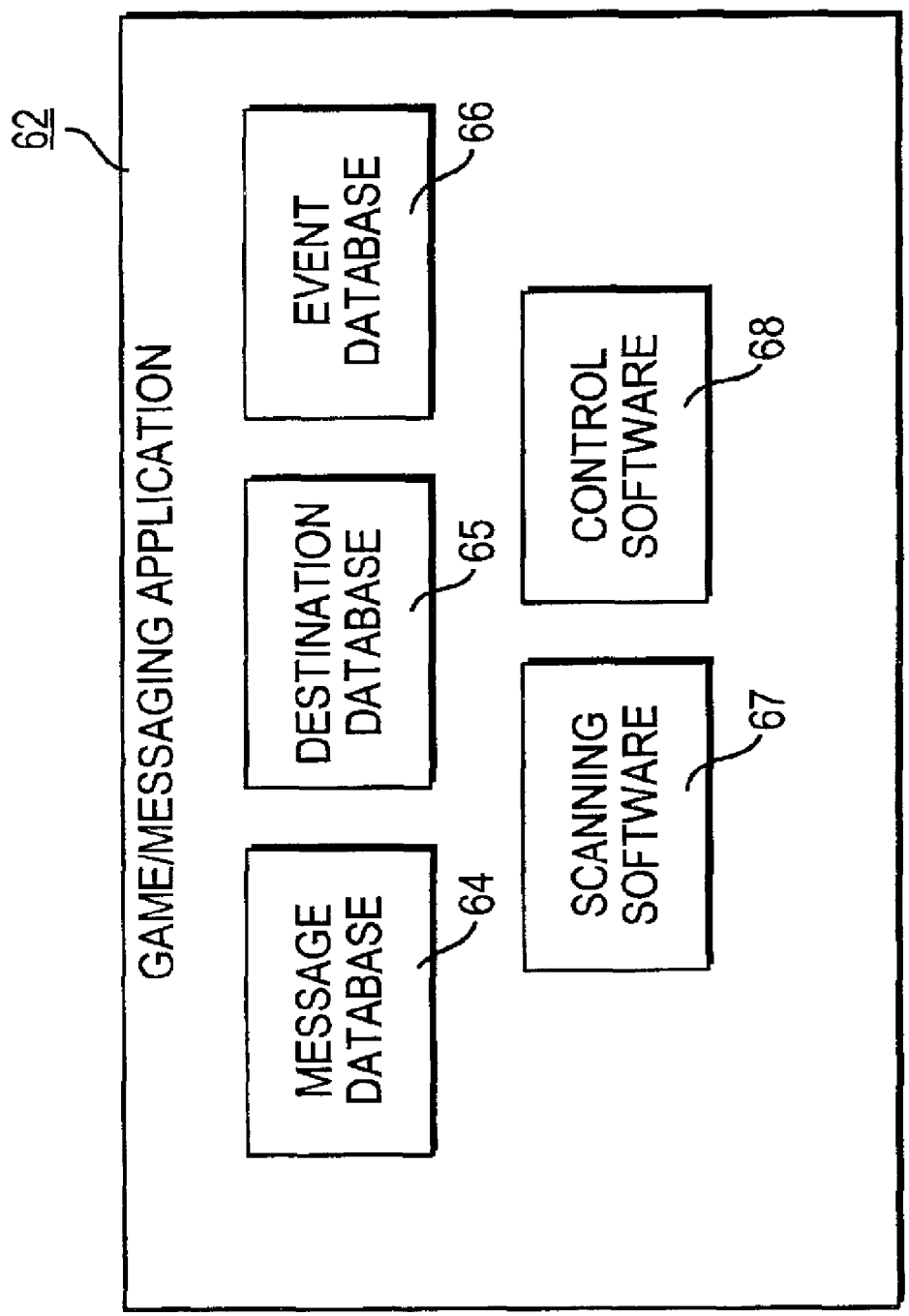
FIG. 3 depicts the components of the game/messaging application at a mobile terminal in the exemplary embodiment of the invention.

With reference to FIG. 3, messaging application 62 comprises a message database 64 for storing game-related predefined messages and to "open" and recognize codes sent by a player from one of the wireless terminals 10, 20 to game platform 40 or directly between terminals 10, 20. For example, the message database 64 must recognize that code *5 sent by terminal 10 represents a particular predefined message in message database 31 that is to be sent to a predefined destination (e.g. sent message 5 to all players). Messaging application 62 further comprises a destination database 65 that stores the predefined destinations where game-related messages are to sent (e.g., addresses of wireless terminals 10, 20 and addresses of any other game platforms). When a user enters a command to send a predefined message, the command is sent to game platform 40, which receives the command and sends the message to the destination address(es), as previously specified to the game platform 40, as specified in the command, or as specified in message database 64.

Messaging application 62 further comprises an event database 66 for storing game-related events that trigger game-related messages, scanning software (or a circuit) 67 that functions as a scanning means for checking the game-related events and comparing them to contents of event database 66, and control software (or a circuit) 68 for preparing a list of event-related predefined messages to be sent to a player when scanning software 67 indicates a match between an event occurring during the game and the events listed in the event database 66.

The communications system 1 permits a player in a WAP or other wireless game system to play and interact with others in the game system using input means 60. For example, by pressing buttons on a keypad or using other simple selection means, such as a touch screen or voice-activated message selection menu, a player to whom a particular predefined message should be sent can be selected or predefined messages can be sent to other players on the game system who are opponents or potential opponents.

Messages may be predefined (and possibly stored) at mobile terminal 10 by the player inputting the content of the messages there or may be predefined at game platform 40, or at some other network element to which a game player has access. Predefined messages may also be entered by the player at a fixed terminal 49 that can communicate with game platform 40 such as over the Internet 43. Alternatively, some predefined messages may be defined at the system level by game administrators or others, such as a group of players, where they are available in message database 31 for access by one or more players. A player may be allowed to modify a system level predefined message and save it as his own predefined message. Some of the predefined messages may be standard types of messages (e.g., "Do you want to play a game?") and others may be customized to a particular player, game, situation, etc. In defining the messages, the game player must also define a key combination or other type of command for sending a particular predefined message. The message database 31 can be accessed by both players and administrators with different modification rights. A player is usually only given permission to modify those messages he has defined himself. Messages may be modified periodically to keep them interesting. Where at least some of the messages are player-defined, it is preferable to define the messages at a time other than during the playing of a game so that it is not necessary to disrupt the game to create a message and to customize the messages that are sent. The player can be said to be "interacting" with the predefined message when selecting and/or defining the messages, or when selecting to whom the predefined messages are to be sent.

A game-related predefined message can be sent at any point after a game player logs onto the game system and may comprise one of different message types. Such predefined messages can be, for example:

A) Game-play Related

This message type is generally used during the playing of games. For example, a message may be defined such that by pressing "#1" during the game, a game player may cause the opponent game player's terminal to say "check mate, buddy" during a chess game and at the same time cause a text message with the same three words to scroll across the opponent's screen.

B) Game-environment Related

This message type includes messages that are sent in an environment related to the game but that are not actually sent during the playing of the game. (In other words, these messages are "outside the game.") This includes game environments, such as game rooms in which games can be started or chat rooms where players can communicate with each other or any other place within the game system before the start of or after finishing a game. (A game room may in fact be a chat room as well.) For example, a player can invite another player who is logged in to join him in playing a game by pressing "*1". This sends a predefined message to the potential opponent's terminal, such as an audible message, that says "Player X wants to play a game of chess with you. Press '*' to accept."

C) Automated

Messages of this type are automatically sent upon the occurrence of a specific event defined by the system or the player. For example, the player can choose to automatically send a selected message to specified other system players that he has preselected every time he logs-in to the game system. This type of message could be "Yo! I am ready to play". A player might also choose to be alerted every time there is a player online who is more highly ranked than he in a particular game. This type of automated message might say: "There is a worthy opponent online." Similarly, a player might select to be notified when someone has passed him on a ranking list of players.

A player who is sent game-related predefined messages can arrange to have some or all of the predefined messages he receives while offline from the gaming system or while at a terminal that is not WAP-enabled (where the WAP is necessary for using the gaming system) to be forwarded to him at another terminal from which he can retrieve the messages, such as forwarding the messages to his email address, to an alphanumeric pager, or to a short message system of the terminal that is not WAP-enabled. This enables a player to react, such as by returning to a WAP-enabled terminal and logging into the gaming system, if something happens in a game in which he is engaged while he is offline.

A predefined multimedia message may comprise a picture in a particular format. In multimedia messaging, such as in the multimedia messaging service (MMS) available on mobile terminals (like Nokia mobile phones model numbers 3210, 3310, and 6210), the picture portion of the multimedia message can be sent by using, for example, the short message service (SMS) as the bearer. Sounds included in a predefined message may be any type of sound, such as a human voice, possibly of the game player, a synthesized voice, a sound of an explosion in a war-related game, or a part of a song, such as "We are the Champions!", as appropriate.

The terminals receiving the predefined messages must of course have the capability of playing the received messages, including display and sound capabilities. For example, the picture (or video) in a multimedia message can be shown on a mobile terminal only if the terminal has the capability of showing the picture in the particular format it is in. On those terminals that do not have that capability, the pictures may be displayed in an unclear manner or not displayed at all. A record of terminal capabilities, including information about whether or not a particular phone is able to display a picture in a particular message format, may be registered in a server at game platform 40, such as in destination database 32, at some other part of the network element accessible to game platform 40, and/or at destination database 65 at wireless terminal 10. Where the picture messages are not displayable at a particular terminal, the picture portion of the message sent to those terminals may be converted at the server, if possible, to alphanumeric characters and/or voice so that users of these terminals can also utilize the predefined message schema. Using the record of terminal capabilities, where a predefined message having a picture is to be sent to multiple terminals, at least one of which does not support the display of the picture, game platform 40 will send the complete message with picture to those terminals that can display the picture and will modify the message and send text in place of the picture (the text being a brief description of the contents of the picture) to the player(s) whose terminals cannot display the picture.

FIG. 4 shows an example of destination database 32 which stores the record of terminal capabilities along with the predefined destinations where game-related messages are to be sent. For example, in FIG. 4, player 1 has a wireless terminal whose destination address is Address1 and is a Nokia terminal model 3210 which is capable of displaying picture messages. Player 2 has a wireless terminal whose destination address is Address2 and is a Nokia terminal model 6210 which similarly is capable of displaying picture messages. Player 22 has a wireless terminal whose destination address is Address22 that is a Nokia terminal model 2110 which is only capable of displaying text messages but not picture messages so game platform will send a text message to player 22 in lieu of a picture message that is sent to player 22. Player 23's Nokia multimedia terminal, having a destination address Address23, can display video messages.

A player may be able to memorize the messages and their methods of selection and can, in that case, send one of the predefined messages by pressing the appropriate keys. Alternatively, the player can select a Help feature to display a menu of messages such as the sample Help menu screen 74 that is displayed in FIG. 5A on a mobile terminal 10, which in this example is a mobile phone. The displayed screen 74 contains five predefined messages, each of which can be activated by entering a code on the keypad. For example, pressing the "Star" (*) key 72 followed by the indicated number activates the desired predefined message to be sent to one or more preselected destination addresses. The destination addresses are generally addresses of mobile or fixed terminals of potential players, e.g. potential players in the chat room, game room, etc. In this example, pressing "*1" at screen 74 sends the message "Wanna Play?" to selected potential players. Message 4 is reserved in this example for a user-defined message. The players to whom a predefined message are to be sent may be selected from a similar menu that may be displayed. Generally, the players to whom the message is sent may be designated with a default setting so that the number of clicks required by the user interface is kept to a minimum. The menu of messages and the menu of players to whom the messages may be sent may be scrolled through with button 76 that allows the player to scroll up and down through the menu.

Game-related predefined messages can also be activated and sent by some other easy activation means such as buttons 77a, 77b on terminal 20 that can be dedicated to this functionality. The choice of predefined messages offered on screen at a particular time may be filtered so that only a menu of message choices that are appropriate to the state at which the player is in the game system is offered or displayed. Messages that are unnecessary or otherwise inappropriate at that state are not offered or are at least not displayed.

Figure 5:
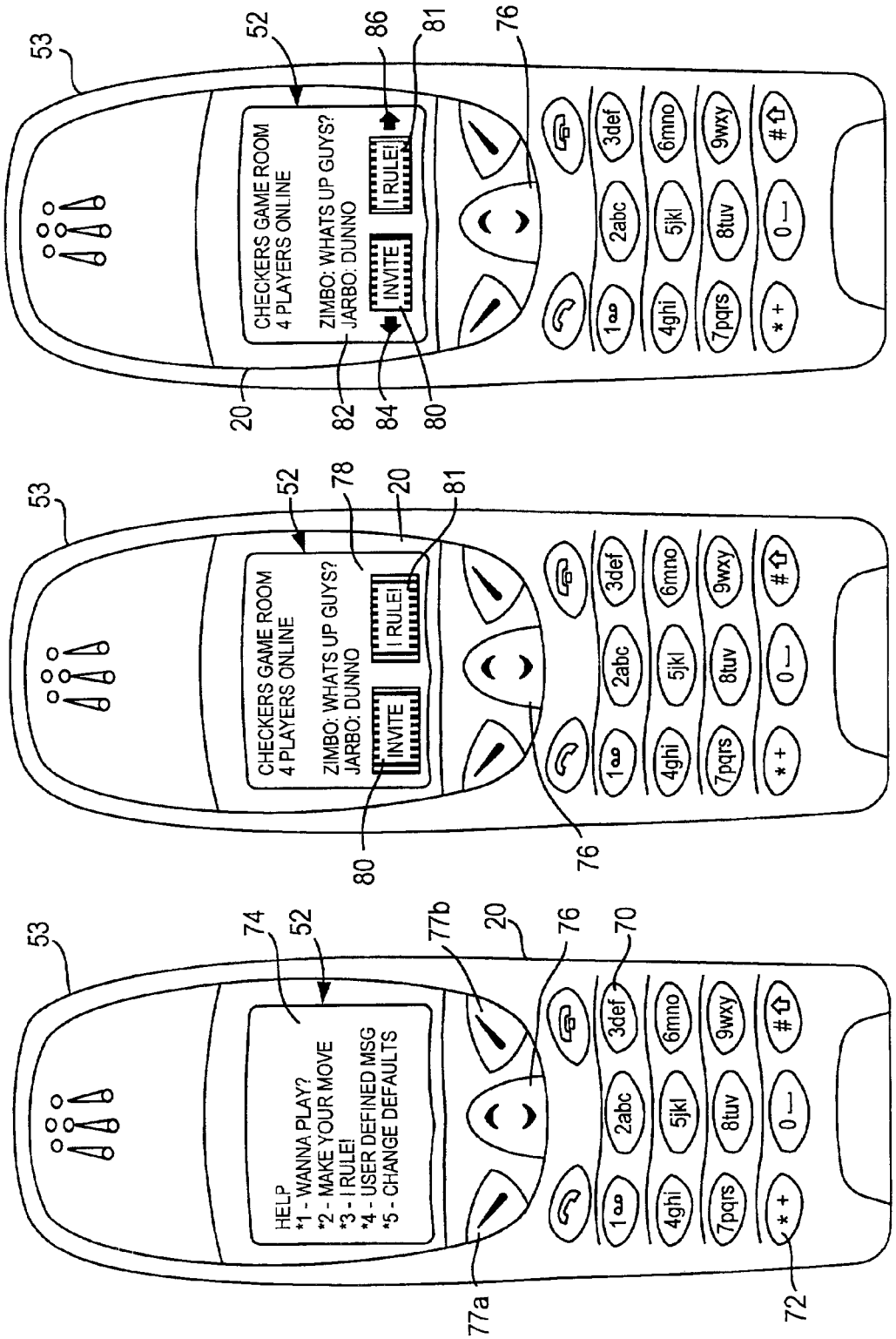
FIG. 5A depicts a mobile phone displaying a sample menu of predefined messages available to be sent by a mobile phone user by entering a corresponding code from the keypad.
FIG. 5B depicts a mobile phone displaying a sample menu of predefined messages available by using a selection mechanism like up and down arrow buttons.
FIG. 5C depicts a mobile phone displaying a sample menu of predefined messages available by using an alternate selection mechanism.

FIG. 5B shows another sample screen 78 illustrating a game room for checkers players from which predefined messages may be sent. In the illustrated checkers game as many as four players may play a single checkers game online. In the illustrated dialog, Zimbo says "What's up guys?" to which Jarbo responds "Dunno" (i.e., I do not know). The game player at mobile phone 10 has two possible messages represented by respective icons 80, 81 to send to the other members of the chat room: "Invite" and "I rule!". Instead of selecting to send either of these messages with a combination of two numerical keys on keypad 70 as in FIG. 3A, one may select either of these messages by tabbing to the appropriate icon of icons 80, 81 or if display 52 is a touch screen by touching on the respective icon.

FIG. 5C illustrates another sample screen 82 that is a close variation of screen 78 but displays the icons 80, 81 as part of a menu of icons. The other icons are not displayed on screen 82 at the same time as icons 80, 81 but are selectable by clicking on left-pointing or right-pointing arrows 84, 86 which causes other available icons to be displayed. Any of the predefined messages, such as those shown in FIGS. 5A–5C, may also be selected by a voice command from a voice-activated message selection menu, if available on communication system 1.

Rather than invoking the Help command to display a menu of functions available at a particular point in the game, the messaging application 62 can also scan for game-related events to identify conditions that match predefined game-related criteria. One such conduction may be an action of a player that occurs during a game or outside the game, using predefined game-related criteria (e.g., a player loses or is killed). When such a condition occurs, the messaging application 62 offers to the player a selection of messages suitable to that condition to be sent to a selectable player and/or player group. For example, when a player kills an opponent in a game, the player might have a small pop up-screen on the display of a mobile terminal 20 indicating a list of available commands and any predefined destinations associated therewith. The exemplary list shown on the display could be the following:

TABLE I

| Msg. No. | Message Contents | And Destinations |
|---|---|---|
| 1 | Gotcha | (to killed player) |
| 2 | You're wasted | (to killed player) |
| 3 | One more killed | (to all players) |
| 4 | I'm the master! | (to all players) |
| 5 | Foe killed | (to team members) |
| 6 | One more down! | (to team members) |
| 7 | optional | (to killed player) |
| 8 | optional | (to all players) |
| 9 | optional | (to team members) |

The predefined criteria for which the messaging application 62 scans could be an event occurring during the game (e.g. hit, kill, seeing opponent, entering place, etc.), or outside the game (e.g. entering chat room, starting game, looking for opponents, etc.). When an event triggers the predefined messages, the messages that are available are limited to the messages that relate to the event currently happening. A message that is entered at least partly by user can also be made available at this point even where this message does not match the predefined criteria (e.g. optional messages number 7 and number 9 in Table I.) A player can select a suitable predefined message to be sent to a selected address by, for example, using one or more browser buttons. Using the example in Table I, by pressing button #1 a player sends a "Gotcha" message to a killed player and by pressing #5 a player sends a "Foe killed" message to other members of his team. In a further automated scenario, there may be a message prompt to the player offering a particular predefined message, and a user has the option of responding with a "yes" (send the predefined message) or "no" (do not send the predefined message).

Figure 6:
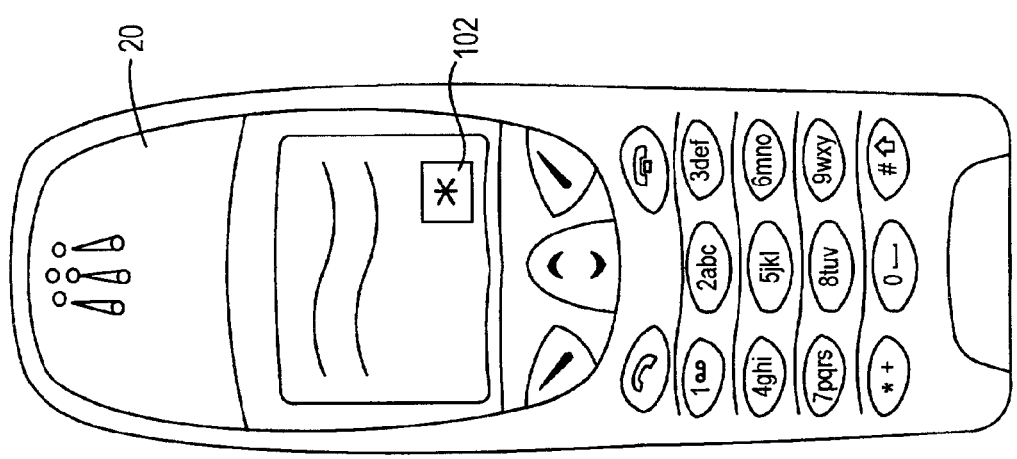
FIG. 6 depicts a mobile phone on which an indicator is displayed to indicate the availability of at least one predefined message.

The availability of predefined messages to be sent can also be indicated by an indicator like a shortcut or by a blinking asterisk somewhere on the display screen which opens a look-up table such as Table I upon user activation to display a menu of available options. FIG. 6 illustrates an example of such a blinking asterisk 102 appearing on the display screen during a game. When a user is interested in sending a predefined message, he activates the asterisk and the pop up screen with a menu of choices in the look-up table appears. The size of the pop up screen could be from ¼ size or even smaller screen to a whole screen covering over the look-up table). The user can then select the destination address(es) to whom the predefined message should be sent using the screen prompts.

As illustrated in the example of Table I, the game platform 40 that handles the messages can have several "layers". For example, sometimes a player might want to send a message to his team, but not his opponents, to advise his team that he has "killed" an opposing player. He can send message number 5 for this purpose. To notify his opponents of the same thing, he could send message number 3.

Instead of sending messages with different numbers, the same message can be sent in one of various "modes" made available for sending predefined messages. For example, in one mode, by pressing "*1", "*2", or "*7" the player sends a message #1, #2, or #7, respectively, to all participants of the game. In a second mode, the player sends a message #1, #2, or #7, respectively, to all players on his team by pressing "01", "02", or "07".

Figure 7B:
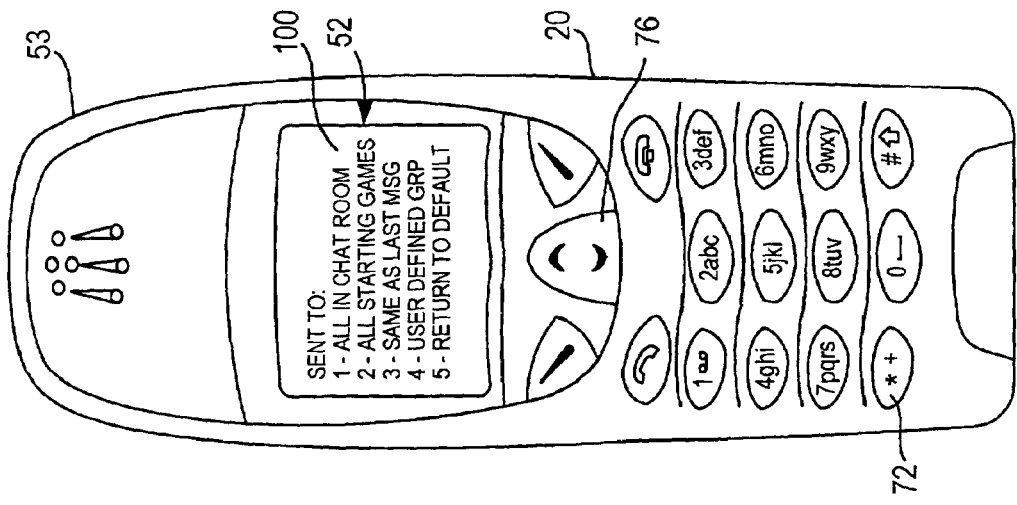
FIG. 7B depicts a mobile phone displaying a sample menu of groups any one of which can be selected as the default group to whom a predefined message will be sent while the player sending the predefined message is in a chat room.
Figure 7A:
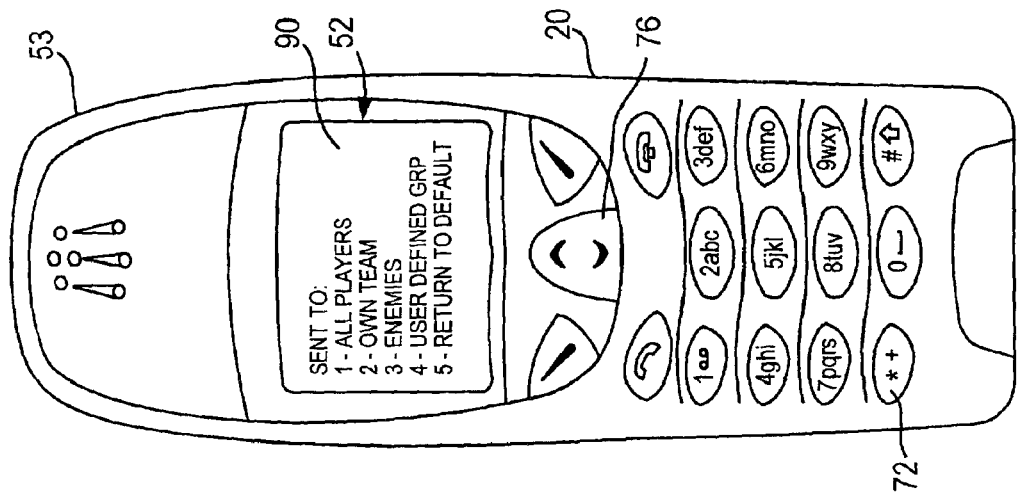
FIG. 7A depicts a mobile phone displaying a sample menu of groups any one of which can be selected as the default group to whom a predefined message will be sent during a game.

As another alternative, a predefined message for which no destination is explicitly specified by the message can be sent to a default player or group of players. The default setting for players to whom the predefined message is sent may differ depending on where the player sending the message is in the game system. To change the defaults, the player can press "*5" at screen 74 to enter the "change defaults" command. If the player was playing a game when entering the "change defaults" command, a screen such as screen 90 shown in FIG. 7A may be displayed and offer a menu of groups 1–4 comprising one or more persons to whom messages could be sent as a default. The player can choose any of the available groups, which may include for example the following illustrated groups: Group 1—all players of a particular game receive the messages; Group 2—only players on the sender's own team receive the messages; Group 3—only enemies receive the messages; and Group 4—a user-defined group receives the message. Pressing "5" at screen 90 returns the player to the previously defined default setting. If the player was in a chat room when entering the "change defaults" command, a screen such as screen 100 shown in FIG. 7B may be displayed and offer another menu of groups 1–4 comprising one or more persons to whom messages could be sent as a default. The player can choose any of the available groups at screen 100, which may include for example the following illustrated groups: Group 1—everyone in the chat room receive the messages; Group 2—all players starting a game receive the messages; Group 3—the same default group as for the previously sent message; and Group 4—a user-defined group receives the message. Pressing "5" at screen 100 returns the player to the previously defined default setting.

In trivia-type games, a user could send a predefined message to obtain hints (or actual answers) for answering the questions by sending the message comprising a copy of the question to game platform 40 or some other source of help to receive either an automated response or personal assistance. In non-trivia-type games, a predefined message can be sent to obtain help and may contain contents specifically relevant to the particular game being played as well as the current situation that has been encountered during the game (e.g. a particular move, question, or other situation). In either type of game, the message will include a phone number or numbers, internet address either automatically or inputted manually by the user, or other contact information to which the help source can send a reply containing the requested information. The message may also contain information for charging the user for assistance, whether by using a credit card, using credit received by playing the game, or by some other means. The predefined messages could also contain information related to the user location, utilizing information received from a global positioning satellite system (GPS), mobile network or by some other corresponding means. In certain situations, such as where a game player waits too long to perform an action, respond to a trivia question, etc., the game may prompt the player to send a predefined message requesting help or the game may cause a predefined message requesting help to be sent.

When a terminal receives a multimedia predefined game-related message, an indication that a message has been received may be displayed on the receiving terminal. The received indication may be a picture that reflects the contents of the message. For example, when a player wins a game, the picture can represent the winning of a prize with a picture of a trophy, gold bullion, money purse, etc. that indicates the value of the prize. The picture may be, for example, an electronic coupon which could be utilized later when buying an item, where the item may be, for example, additional playtime i.e. connection time to the game system.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. An online gaming system for playing games, the system comprising:

at least one wireless terminal adapted to run a multiplayer game to be played between said at least one wireless terminal and at least one other terminal running the game;

a game program executable by the at least one wireless terminal for providing game-related events;

means for determining a state of the game comprising means for scanning the game-related events, wherein at least one game-related predefined message is presented to a user of the at least one wireless terminal based on the determined state of the game;

means for selecting, by the user, whether to transmit the presented at least one game-related predefined message wirelessly from said at least one wireless terminal to said at least one other terminal;

means for modifying, if necessary, the at least one game-related predefined message to match the terminal capabilities of said at least one other terminal to which the predefined message is to be sent; and means for transmitting said at least one game-related predefined message to said at least one other terminal.

2. The online gaming system of claim 1,
wherein the state of the game comprises at least one of before a game is being played by the user, during a game being played by the user, after a game has been played by the user, and when a predefined game-related criteria is met; and
wherein the predefined game-related criteria comprises an event that is related to the game and is predefined.

3. The online gaming system of claim 2, wherein the predefined game-related event comprises one of capturing an opponent, beating the opponent, killing the opponent, hitting the opponent, seeing the opponent, being captured, being killed, being hit, and being seen by the opponent during the game.

4. The online gaming system of claim 2, wherein the predefined game-related criteria are met where at least one of the scanned game-related events match at least one of a plurality of predefined game-related events.

5. The online gaming system of claim 4, wherein the at least one game-related predefined message comprises content related to the at least one game-related event if the predefined game-related criteria are met.

6. The online gaming system of claim 4, wherein the at least one game-related predefined message is sent automatically to the at least one other terminal when at least one of the scanned game-related events matches at least one of the plurality of predefined game-related events.

7. The online gaming system of claim 1, wherein the game program comprises an indicator to be displayed when the at least one game-related predefined message appropriate for the state of the game is available for sending.

8. The online gaming system of claim 1, wherein the at least one wireless terminal comprises:
a dedicated button to be activated by the user to send the at least one game-related predefined message to the at least one other terminal.

9. The online gaming system of claim 1, wherein the at least one game-related predefined message comprises at least one of:
a game-play message to be sent to the at least one other terminal during a game, and
a game-environment message related to playing a game to be sent to the at least one other terminal before or after the game.

10. The online gaming system of claim 1, wherein the at least one game-related predefined message comprises at least one of voice, text, sound, an image, a picture, a video, and a multimedia message.

11. The online gaming system of claim 1, wherein the at least one other terminal to which the game-related predefined message is to be sent is preselected.

12. The online gaming system of claim 1, wherein the at least one other terminal to which the game-related predefined message is to be sent comprises a predefined category of one or more players.

13. The online gaming system of claim 12, wherein the predefined category comprises at least one of all players presently online, all players not presently engaged in a game, all players presently initiating a game, all players presently engaged in a game, all players on the user's own team, all players on an opposing team, at least one player previously defined by the user, and a game platform running the game.

14. The online gaming system of claim 13, wherein the at least one player previously defined by the user is defined by a gaming attribute.

15. The online gaming system of claim 14, wherein the gaming attribute is the relative ranking of the player.

16. The online gaming system of claim 12, wherein the predefined category changes depending on the state of the game.

17. The online gaming system of claim 1, wherein the at least one game-related predefined message comprises a picture and the terminal capabilities of the at least one other terminal do not support reproducing a picture, and wherein the at least one game-related predefined message is modified by replacing the picture in the at least one game-related predefined message with text describing the picture.

18. The online gaming system of claim 1, further comprising:
a destination database containing records for each of the at least one other terminal, wherein each record comprises the output capacity of the at least one other terminal.

19. The online gaming system of claim 18, wherein the means for modifying the at least one game-related predefined message modifies the at least one game-related predefined message based on the output capacity of the at least one other terminal, wherein the output capacity is determined by accessing the destination database.

20. The online gaming system of claim 18, wherein the destination database is located in at least one of the at least one wireless terminal and a game platform running the game.

21. The online gaming system of claim 18, further comprising:
means for logging into the game, wherein each terminal logged into the game has a corresponding record in the destination database.

22. The online gaming system of claim 1, further comprising:
storage means for storing game-related predefined messages, wherein each game-related predefined message is identified by a code and, when a code is sent to the storage means, the storage means recognizes and provides the game-related predefined message identified by the received code.

23. The online gaming system of claim 1, further comprising:
a game platform configured to communicate with the at least one wireless terminal comprised of:
storage means for storing game-related predefined messages;
means for a player to log into the game platform; and
a player database containing records for each player logged in to the game platform, wherein each record comprises the destination address of the logged in player and the output capacity of the terminal of the logged in player;
wherein the game platform is the platform on which logged in players play with each other.

24. An online gaming system for playing games, the system comprising:
at least one wireless terminal adapted to run a game to be played with at least one other terminal running the game;
a processor within the at least one wireless terminal for controlling functions relating to the game;
a storage device in communication with the processor;
a game program operative on the processor of the at least one wireless terminal comprising:
means for maintaining in the storage device a database identifying at least one set of predefined messages available to send from said at least one wireless terminal to said at least one other terminal;

means for scanning game-related events to identify conditions matching any of at least one predefined game-related criteria; and means for presenting at least one game-related predefined message to a user of said at least one wireless terminal when at least one of the conditions matching any of the at least one predefined game-related criteria is identified, wherein the at least one game-related predefined message may be selected by the user to be sent from said at least one wireless terminal to said at least one other terminal;

means for modifying the at least one game-related predefined message to match the terminal capabilities of said at least one other terminal to which the at least one game-related predefined message is sent, wherein the at least one game-related predefined message is subject to interaction with a user of the at least one wireless terminal; and means for transmitting said at least one game-related predefined message to said at least one other terminal.

25. The online gaming system of claim 24, wherein the predefined game-related criteria comprises an event that is related to the game and is predefined.

26. The online gaming system of claim 25, wherein the predefined game-related event comprises one of capturing an opponent, beating the opponent, killing the opponent, hitting the opponent, seeing the opponent, being captured, being killed, being hit, and being seen by the opponent during the game.

27. The online gaming system of claim 24, wherein the game program comprises:

an indicator to be displayed on the at least one wireless terminal when at least one of the conditions matching any of the at least one predefined game-related criteria is identified, wherein the at least one game-related predefined message is appropriate to the scanned at least one predefined game-related event matching any of the at least one predefined game-related criteria, and wherein said indicator indicates that the at least one game-related predefined message is available for sending.

28. The online gaming system of claim 24, wherein the at least one wireless terminal comprises:

a dedicated button to be activated by the user to send the at least one game-related predefined message to the at least one other terminal.

29. The online gaming system of claim 24, wherein the at least one game-related predefined message comprises at least one of:

a game-play message to be sent to the at least one other terminal during a game, and a game-environment message related to playing a game to be sent to the at least one other terminal before or after the game.

30. The online gaming system of claim 24, wherein the at least one game-related predefined message comprises at least one of voice, text, sound, an image, a picture, a video, and a multimedia message.

31. The online gaming system of claim 24, wherein the at least one wireless terminal comprises:

means for transmitting a short code representing a particular at least one game-related predefined message, wherein the short code is recognized and the particular at least one game-related predefined message is transmitted to a specified at least one of the at least one other terminal.

32. The online gaming system of claim 31, wherein the database maintained in the storage device comprises:

records containing short codes, including said short code, wherein each short code represents at least one of the at least one game-related predefined message.

33. The online gaming system of claim 32, further comprising:

a message database for recognizing the short code from the at least one wireless terminal, for presenting the particular at least one game-related predefined message represented by the short code, and for storing the particular at least one game-related predefined message.

34. The online gaming system of claim 33, wherein the specified at least one of the at least one terminal is at least one of i) previously specified; ii) specified in a communication accompanying the short code from the at least one at least one wireless terminal; iii) specified in the message database; and iv) specified in the database maintained in the storage device.

35. A method of providing an online gaming system for playing games, the method comprising the steps of:

connecting at least one wireless terminal adapted to run a game to be played with at least one other wireless terminal running the game;

scanning game-related events to identify conditions matching any of at least one predefined game-related criteria;

presenting at least one game-related predefined message to a user of said at least one wireless terminal when at least one of the conditions matching any of the at least one predefined game-related criteria is identified;

selecting, by the user of the wireless terminal, the at least one game-related predefined message in order to sent the at least one game-related predefined message from said at least one wireless terminal to said at least one other terminal;

modifying, if necessary, the at least one game-related predefined message to match the terminal capabilities of said at least one other terminal to which the at least one game-related predefined message is to be sent; and transmitting said at least one game-related predefined message to said at least one other terminal.

36. The method of claim 35, wherein the predefined game-related criteria comprises an event that is related to the game and is predefined.

37. The method of claim 36, wherein the predefined game-related event comprises one of capturing an opponent, beating the opponent, killing the opponent, hitting the opponent, seeing the opponent, being captured, being killed, being hit, and being seen by the opponent during the game.

38. The method of claim 35, wherein the at least one game-related predefined message comprises at least one of:

a game-play message to be sent to the at least one other terminal during a game, and a game-environment message related to playing a game to be sent to the at least one other terminal before or after the game.

39. The method of claim 35, wherein the at least one game-related predefined message comprises at least one of voice, text, sound, an image, a picture, a video, and a multimedia message.

40. The method of claim 35, further comprising the step of at least one of:
defining the at least one game-related predefined message; and
selecting the at least one destination address to which the at least one game-related predefined message may be sent.

41. The online gaming system of claim 40, wherein the at least one wireless terminal comprises:
means for transmitting a short code representing a particular at least one game-related predefined message, wherein the short code is recognized and the particular at least one game-related predefined message is transmitted to a specified at least one of the at least one other terminal.

42. The online gaming system of claim 41, wherein the at least one wireless terminal further comprises:
a short code database for storing a plurality of short codes, including said short code, wherein each short code represents at least one of the at least one game-related predefined message.

43. The online gaming system of claim 42, further comprising:
a message database for recognizing the short code from the at least one wireless terminal, for presenting the particular at least one game-related predefined message represented by the short code to the game platform, and for storing the particular at least one game-related predefined message.

44. The online gaming system of claim 43, wherein the specified at least one of the at least one terminal is at least one of i) previously specified; ii) specified in a communication accompanying the short code from the at least one at least one wireless terminal; iii) specified in the message database; and iv) specified in the short code database in the at least one wireless terminal.

45. The method of claim 35, further comprising the steps of:
transmitting, by the at least one wireless terminal, a short code representing a particular at least one game-related predefined message;
recognizing the short code; and
transmitting the particular at least one game-related predefined message represented by the recognized short code to a specified at least one of the at least one other terminal.

46. The method of claim 45, further comprising the steps of:
storing short codes, including said short code, in the at least one wireless terminal, wherein each short code represents at least one of the at least one game-related predefined message.

47. The method of claim 46, further comprising the step of:
storing, in a message database, the particular at least one game-related predefined message represented by the stored short codes.

48. The method of claim 47, wherein the specified at least one of the at least one terminal is at least one of i) previously specified; ii) specified in a communication accompanying the short code from the at least one at least one wireless terminal; iii) specified in the message database; and iv) specified in the database maintained in the storage device.

49. A wireless terminal for playing games, the terminal comprising:

a processor for controlling functions relating to a game;
a storage device in communication with the processor;
a primary input in communication with the processor for registering game-related commands input by a user of a wireless terminal;
a game program operative on the processor of the wireless terminal comprising:
means for maintaining in the storage device a database identifying at least one set of predefined messages available to send to at least one other terminal;
means for presenting at least one game-related predefined message to a user of the wireless terminal based on a state of the game; and
means for selecting, by the user, the at least one game-related predefined message in order to send the at least one game-related predefined message to the at least one other terminal;
means for modifying, if necessary, the at least one game-related predefined message to match terminal capabilities of the at least one other terminal; and
means for transmitting said at least one game-related predefined message to said at least one other terminal.

50. The wireless terminal of claim 49,
wherein the state of the game comprises at least one of before a game is being played by the user, during a game being played by the user, after a game has been played by the user, and when a predefined game-related criteria is met; and
wherein the predefined game-related criteria comprises an event that is related to the game and is predefined.

51. The wireless terminal of claim 50, wherein the predefined game-related event comprises one of capturing an opponent, beating the opponent, killing the opponent, hitting the opponent, seeing the opponent, being captured, being killed, being hit, and being seen by the opponent during the game.

52. The wireless terminal of claim 49, wherein the at least one game-related predefined message comprises at least one of:
a game-play message to be sent to the at least one other terminal during a game, and
a game-environment message related to playing a game to be sent to the at least one other terminal before or after the game.

53. The wireless terminal of claim 49, wherein the at least one game-related predefined message comprises at least one of voice, text, sound, an image, a picture, and a video.

54. The wireless terminal of claim 49, further comprising:
means for transmitting a short code representing a particular at least one game-related predefined message, wherein the short code is recognized and the particular at least one game-related predefined message is transmitted to a specified at least one of the at least one other terminal.

55. The wireless terminal of claim 54, wherein the database maintained in the storage device comprises:
records containing short codes, including said short code, wherein each short code represents at least one of the at least one game-related predefined message.

56. The wireless terminal of claim 55, wherein the specified at least one of the at least one terminal is at least one of i) previously specified; ii) specified in a communication accompanying the short code from the at least one at least one wireless terminal; and iii) specified in the database maintained in the storage device.

57. An online gaming system comprising:

at least one wireless terminal on a cellular telephone network for running a player client program, said player client program having a communication link with a game server program; and a game platform on a wide area network for running the game server program, and for providing a platform on which a user of the at least one wireless terminal can play a game using the player client program, the game platform comprising:

means for the user to log in to the game platform so that the user becomes a logged-in player in the game;

a player database containing records for each player logged in to the game platform, wherein each record comprises the destination address of the logged in player and the output capacity of the terminal of the logged in player;

means for storing at least one predefined message;

means for determining a state of the game by scanning game-related events in the game with scanning software;

means for presenting at least one game-related predefined message to the logged-in player of the wireless terminal based on the state of the game, wherein the logged-in player selects whether to transmit the at least one game-related predefined message to at least one other terminal; and means for modifying, if necessary, the at least one game-related predefined message to match the terminal capabilities of the at least one other terminal to which the predefined message is to be sent.

58. The online gaming system of claim 57, wherein the at least one wireless terminal comprises:

means for transmitting a short code representing a particular at least one game-related predefined message to the game platform, whereby the game platform recognizes the short code and transmits the particular at least one game-related predefined message to a specified at least one of the at least one other terminal.

59. The online gaming system of claim 58, wherein the game platform comprises:

a message database for recognizing the short code from the at least one wireless terminal, for presenting the particular at least one game-related predefined message represented by the short code to the game platform, and for storing the particular at least one game-related predefined message.

60. The online gaming system of claim 59, wherein the specified at least one of the at least one terminal is at least one of i) previously specified to the game platform; ii) specified in communication accompanying the short code from the at least one wireless terminal; and iii) specified in the message database.

* * * * *